(12) United States Patent
Asai

(10) Patent No.: US 11,734,874 B2
(45) Date of Patent: Aug. 22, 2023

(54) AIRFRAME MAINTENANCE-INSPECTION SYSTEM

(71) Applicant: SUBARU CORPORATION, Tokyo (JP)

(72) Inventor: Takayuki Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/688,104

(22) Filed: Mar. 7, 2022

(65) Prior Publication Data

US 2022/0309738 A1 Sep. 29, 2022

(30) Foreign Application Priority Data

Mar. 23, 2021 (JP) ................. 2021-049047

(51) Int. Cl.
*G06T 7/00* (2017.01)
*G06T 15/10* (2011.01)
*H04N 7/18* (2006.01)
*G06T 7/292* (2017.01)
*H04N 13/332* (2018.01)
*G01H 9/00* (2006.01)
*G06F 1/16* (2006.01)
*B64F 5/60* (2017.01)
(Continued)

(52) U.S. Cl.
CPC ................ *G06T 15/10* (2013.01); *B64F 5/60* (2017.01); *G01H 9/00* (2013.01); *G06F 1/163* (2013.01); *G06F 3/011* (2013.01); *G06T 7/0004* (2013.01); *G06T 7/292* (2017.01); *H04N 7/183* (2013.01); *H04N 13/332* (2018.05); *H04N 23/90* (2023.01); *G06T 2200/04* (2013.01); *G06T 2207/10016* (2013.01); *G06T 2207/30108* (2013.01)

(58) Field of Classification Search
CPC . G06F 1/163; G06F 3/011; B64F 5/60; G01H 9/00; H04N 7/183; H04N 23/90; H04N 13/332; G06T 7/0004; G06T 7/292; G06T 15/10; G06T 2200/04; G06T 2207/10016; G06T 2207/30108
See application file for complete search history.

(56) References Cited

U.S. PATENT DOCUMENTS 7,131,136 B2 * 10/2006 Monroe ................. H04N 7/181
348/E7.086
9,952,438 B1 * 4/2018 Broadhead .............. G06F 3/012
(Continued)

OTHER PUBLICATIONS

ANA Line Maintenance Technics Co., Ltd., "Works", retrieved at http://www.ltc.ana-g.com/service.html on Oct. 28, 2021.

*Primary Examiner* — Phi Hoang
(74) *Attorney, Agent, or Firm* — McDermott Will & Emery LLP

(57) ABSTRACT

An airframe maintenance-inspection system includes imaging devices, a transmitter, and a display device. The imaging devices are to be disposed in an aircraft and are configured to respectively capture images of a maintenance-inspection target during a flight of the aircraft. The transmitter is configured to transmit the plurality of images captured by the imaging devices. The display device is configured to display a shape of the maintenance-inspection target in a three-dimensionally viewable state based on the images transmitted by the transmitter.

11 Claims, 4 Drawing Sheets

(51) Int. Cl.
    *G06F 3/01*           (2006.01)
    *H04N 23/90*        (2023.01)

(56) References Cited

U.S. PATENT DOCUMENTS

| | | | |
|---|---|---|---|
| 2013/0083960 A1* | 4/2013 | Kostrzewski | H05K 7/1427 |
| | | | 361/679.01 |
| 2020/0072137 A1* | 3/2020 | Cai | F02D 41/1406 |
| 2020/0122860 A1* | 4/2020 | Dong | B64C 25/001 |
| 2020/0126386 A1* | 4/2020 | Michalopulos | G06V 10/764 |
| 2021/0132683 A1* | 5/2021 | Herling | G06F 3/02 |
| 2021/0329147 A1* | 10/2021 | Kokonaski | H02J 7/342 |

* cited by examiner

AIRFRAME MAINTENANCE-INSPECTION SYSTEM

CROSS-REFERENCE TO RELATED APPLICATIONS

The present application claims priority from Japanese Patent Application No. 2021-049047 filed on Mar. 23, 2021, the entire contents of which are hereby incorporated by reference.

BACKGROUND

The disclosure relates to airframe maintenance-inspection systems for aircrafts.

Line maintenance is to be performed daily for the operation of an aircraft. Line maintenance involves three items, namely, a pre-flight inspection to be performed prior to the first flight of the day, a thru-flight inspection to be performed for every flight, and a post-flight inspection to be performed upon arrival after the final flight.

In a thru-flight inspection, for example, a mechanic at an aircraft parking location performs a visual inspection to check for traces of bird collisions with the aircraft, oil leakages from the airframe and the engine, and whether a tire or a brake is damaged, and repairs problematic areas, where appropriate. For example, see ANA Line Maintenance Technics Co., Ltd., "Works", [searched on Jan. 22, 2021], Internet [URL: http://www.ltc.ana-g.com/service.html].

Furthermore, a mechanic also checks flight information from the pilot and listens to, for example, a flight attendant, as well as inspecting the cockpit and the cabin.

In a post-flight inspection, a mechanic inside a hangar performs a maintenance process, including repairing problematic areas and malfunctioning areas, replacing components, and replacing the engine in some cases.

SUMMARY

An aspect of the disclosure provides an airframe maintenance-inspection system. The airframe maintenance-inspection system includes imaging devices, a transmitter, and a display device. The imaging devices to be disposed in an aircraft and are configured to respectively capture images of a maintenance-inspection target during a flight of the aircraft. The transmitter is configured to transmit the images captured by the imaging devices. The display device is configured to display a shape of the maintenance-inspection target in a three-dimensionally viewable state based on the images transmitted by the transmitter.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Line maintenance at, for example, an airport involves performing the aforementioned visual inspection and the restoration and repair of problematic areas. However, if such an inspection and maintenance process is time-consuming, the departure of the aircraft may sometimes be delayed or canceled.

However, a delayed or canceled departure of the aircraft may cause a problem, such as a reduced operation rate of the aircraft, possibly leading to a decrease in sales of the airline.

It is desirable to provide an airframe maintenance-inspection system that allows an airframe of an aircraft to receive an efficient maintenance and inspection process, so that the operation rate of the aircraft can be maintained and improved.

An airframe maintenance-inspection system according to an embodiment of the disclosure will be described below with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
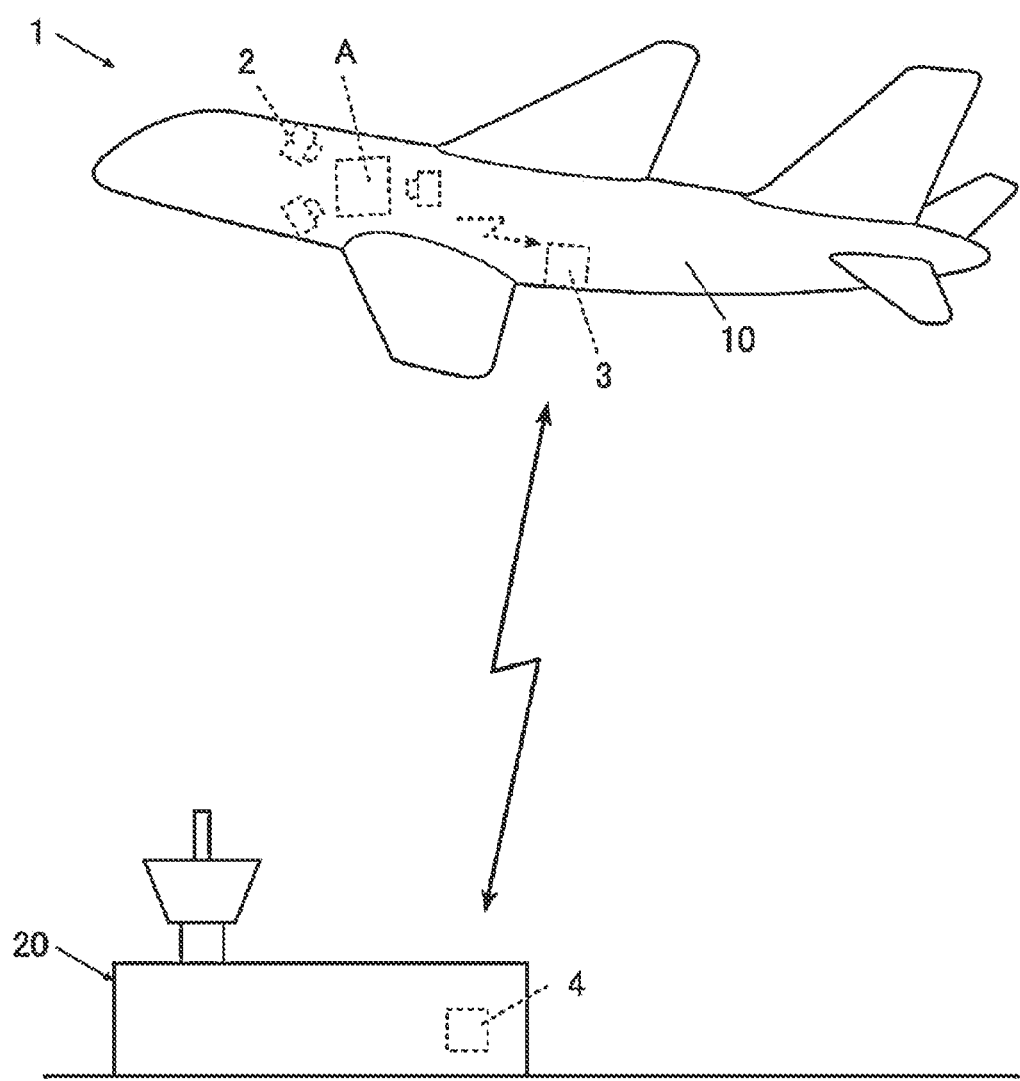
FIG. 1 illustrates the configuration of an airframe maintenance-inspection system according to an embodiment.

FIG. 1 illustrates the configuration of an airframe maintenance-inspection system 1 according to this embodiment. In this embodiment, the airframe maintenance-inspection system 1 includes a plurality of imaging devices 2 and a transmitter 3 equipped in an aircraft 10, as well as a display device 4 disposed at an airport 20.

The following description relates to an example where a maintenance-inspection target A to be inspected and maintained for, for example, aforementioned line maintenance by a mechanic is a wheel (referred to as "wheel A1" hereinafter) of the aircraft 10. The term "wheel" includes, for example, a tire and a brake.

The plurality of imaging devices 2 of the airframe maintenance-inspection system 1 are equipped in the aircraft 10. For example, as illustrated in FIG. 2, the plurality of imaging devices 2 are disposed (e.g., on a wall surface (not illustrated)) inside the aircraft 10 so as to be positioned around the wheel A1 when the wheel A1 is stored after takeoff.

Each of the imaging devices 2 may be configured to capture a still image, or may alternatively be configured to capture a moving image.

Figure 2:
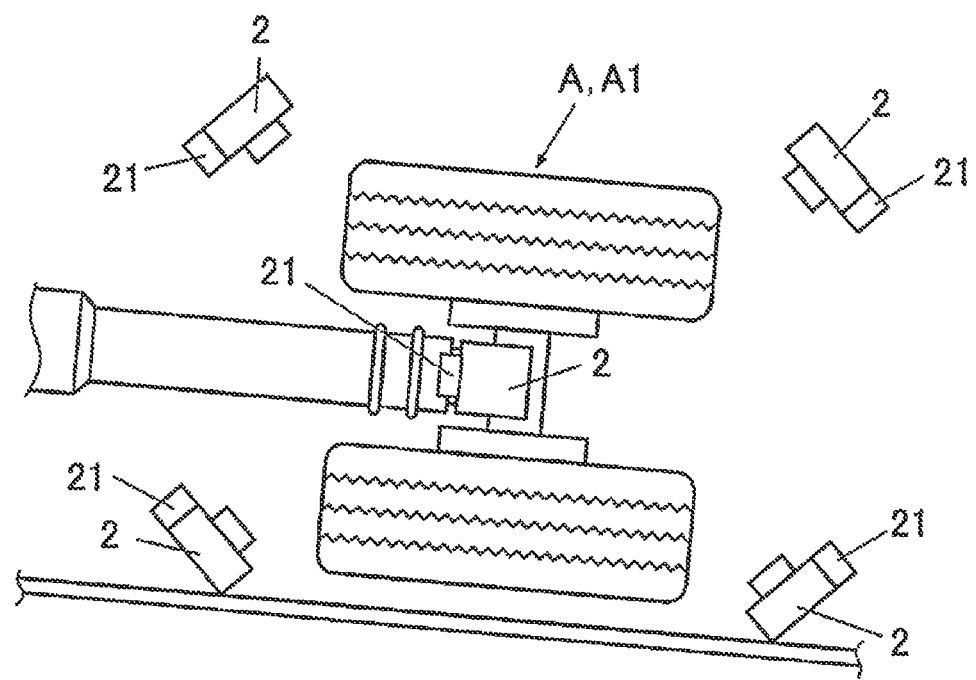
FIG. 2 illustrates a state where a plurality of imaging devices are disposed surrounding a stored wheel.

Although FIG. 2 illustrates a case where five imaging devices 2 are disposed around the stored wheel A1, an appropriate number of imaging devices 2 may be disposed at appropriate locations.

Furthermore, it is not rare that the maintenance-inspection target A is located in a dark place inside the airframe, as in the case of the stored wheel A1.

Therefore, illuminators 21, such as flash devices, may be disposed, as illustrated in FIG. 2, such that the maintenance-inspection target A is to be illuminated with the illuminators 21 when the imaging devices 2 are to capture images.

The plurality of imaging devices 2 each capture an image of the wheel A1 (i.e., the maintenance-inspection target A) stored in the aircraft 10 at a predetermined timing during a flight of the aircraft 10.

In this case, for example, the plurality of imaging devices 2 are each configured to capture an image of the wheel A1 (i.e., the maintenance-inspection target A) at a set timing, such as a timing at which a transmission request is transmitted from the display device 4, to be described later, via the transmitter 3, a timing at which the aircraft 10 has reached a predetermined distance from the airport 20 where the aircraft 10 plans to land, or a timing prior to a scheduled arrival time by a predetermined time period, and transmit the captured image to the transmitter 3.

When the plurality of images are to be transmitted from the plurality of imaging devices 2 to the transmitter 3, the plurality of images may be transmitted wirelessly so that wiring for transmitting the plurality of images from the plurality of imaging devices 2 to the transmitter 3 is not to be newly provided in the aircraft 10, thereby avoiding problems, such as a broken seal for the wiring.

Furthermore, for similar reasons, electric power may be supplied wirelessly to the plurality of imaging devices 2.

The transmitter 3 is constituted of, for example, a wireless communication module.

When the plurality of captured images are transmitted from the plurality of imaging devices 2, the transmitter 3 is configured to transmit the plurality of images wirelessly to the display device 4.

The display device 4 is disposed at a predetermined location (e.g., either one of a waiting location for mechanics and a hangar) in the airport 20 and is configured to display the shape of the wheel A1 (i.e., the maintenance-inspection target A) in a three-dimensionally viewable state based on the plurality of images, transmitted from the transmitter 3, captured by the plurality of imaging devices 2 equipped in the aircraft 10.

A display method in a three-dimensionally viewable state includes a display method (e.g., virtual reality display using, for example, a head up display), to be described below, providing three-dimensional space recognition by reflecting a parallax from left and right compound eyes and a display method (i.e., panorama display using a plurality of displays) from a monocular visual point without providing a parallax.

Figure 3:
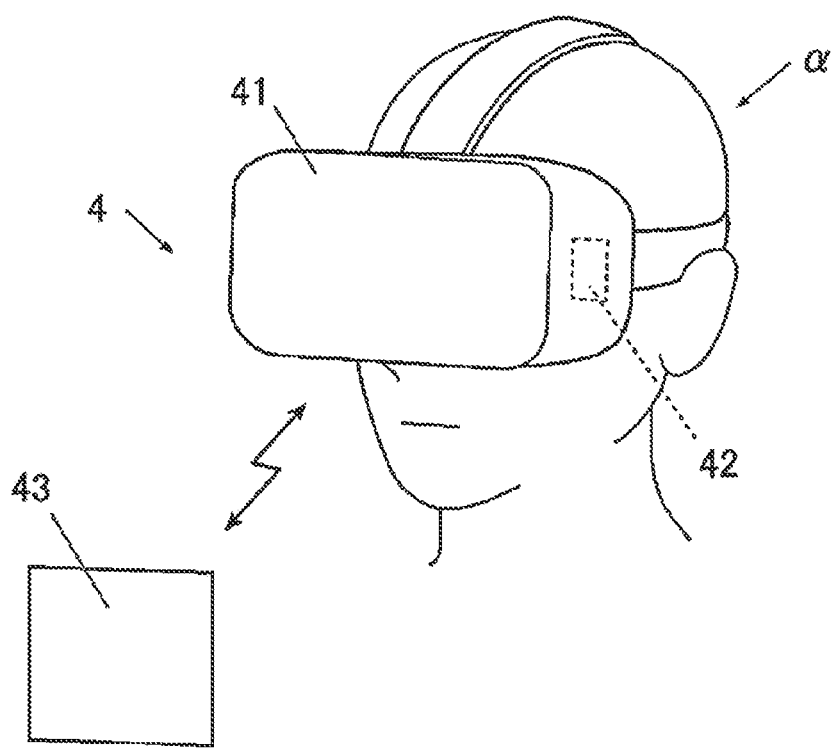
FIG. 3 illustrates a configuration example of a headset, a sensor, and a generator of a display device.

In this embodiment, as illustrated in FIG. 3, the display device 4 includes a headset 41 that is to be worn on the head of, for example, a mechanic a serving as a user and that displays a virtual reality image (referred to as "VR image" hereinafter), a sensor 42 that detects movement and orientation of the headset 41, and a generator 43 that generates a VR image of the maintenance-inspection target A based on the plurality of images of the maintenance-inspection target A transmitted from the aircraft 10 in accordance with the movement and the orientation of the headset 41 detected by the sensor 42.

The generator 43 may be permanently affixed within the headset 41.

The operation of the airframe maintenance-inspection system 1 according to this embodiment will now be described.

Because the airframe maintenance-inspection system 1 is configured as described above in this embodiment, when a plurality of images, captured by the plurality of imaging devices 2, of the wheel A1 (i.e., the maintenance-inspection target A) stored within the airframe are transmitted from the aircraft 10 during a flight, the generator 43 of the display device 4 disposed at the airport 20 generates a VR image of the wheel A1 based on the plurality of images.

Then, when a mechanic serving as a user wears the headset 41 of the display device 4 on the head at, for example, a waiting location in the airport 20, the generator 43 of the display device 4 generates a VR image of the wheel A1 viewable in the direction in which the face of the mechanic is oriented based on the plurality of images in accordance with the orientation of the headset 41 detected by the sensor 42. The headset 41 displays the VR image (i.e., a three-dimensionally viewable image of the wheel A1 (maintenance-inspection target A)) to the mechanic.

Then, the display device 4 repeatedly performs this process.

Therefore, when the mechanic changes the orientation of the face, the movement and the orientation of the headset 41 detected by the sensor 42 change, and the generator 43 generates a VR image of the wheel A1 according to the changes in the movement and the orientation. Thus, the virtual reality image displayed on the headset 41 changes accordingly.

Thus, regardless of the fact that the mechanic is located at the airport 20, the mechanic can view the VR image of the wheel A1 as if the mechanic is on board the aircraft 10 during a flight and is visually inspecting the stored wheel A1 in front of the mechanic.

Consequently, in the airframe maintenance-inspection system 1 according to this embodiment, the mechanic located at the airport 20 can view the VR image (i.e., the three-dimensionally viewable image of the maintenance-inspection target A) and visually inspect the maintenance-inspection target A, such as a wheel, stored within the airframe of the aircraft 10 during the flight of the aircraft 10.

In other words, in the above example, the mechanic located on the ground (i.e., at the airport 20) can visually inspect whether a tire or a brake is damaged while the aircraft 10 is still flying.

Furthermore, when the mechanic views the VR image (i.e., the three-dimensionally viewable image of the maintenance-inspection target A) and discovers a problem in the maintenance-inspection target A, before the aircraft 10 lands, the mechanic can ascertain the status of the problem or determine whether a repair is to be performed. If a repair is to be performed, for example, tools to be used for the repair can be prepared before the aircraft 10 lands.

Consequently, in the airframe maintenance-inspection system 1 according to this embodiment, a visual inspection process of the maintenance-inspection target A and a preparation process for repairing a problematic area can be performed before the aircraft 10 lands. Thus, after the landing of the aircraft 10, line maintenance (such as a thru-flight inspection and a post-flight inspection) can be performed quickly and efficiently on the airframe of the aircraft 10.

Accordingly, with the airframe maintenance-inspection system 1 according to this embodiment, the maintenance-inspection target A can be viewed and inspected while the aircraft 10 is still flying, and a problem, if there is any, can be discovered at an early stage during the flight of the aircraft 10, so that line maintenance can be performed quickly and efficiently on the airframe of the aircraft 10 after the aircraft 10 lands.

Therefore, the probability of a departure delay of the aircraft 10 can be reduced, so that the operation rate of the aircraft 10 can be maintained and improved.

Extension of Embodiment of Disclosure

Objective and Effects of Embodiment of Disclosure

In the airframe maintenance-inspection system 1 according to this embodiment, the staff of the manufacturer of the maintenance-inspection target A and the aircraft 10, in addition to mechanics, can visually check the status of the maintenance-inspection target A during a flight of the aircraft 10 by viewing a VR image (i.e., a three-dimensionally viewable image of the maintenance-inspection target A).

Therefore, by allowing the staff of the manufacturer of the maintenance-inspection target A and the aircraft 10 to view the VR image, the quality of the maintenance-inspection target A and the aircraft 10 can be improved. In addition, for example, if a problem or an abnormality occurs in the maintenance-inspection target A, the staff of the manufacturer can give advice to a mechanic, can give advice to a flight attendant on the aircraft 10 on how to deal with the passengers, or can assist in the flight attendant's decision-making process.

Furthermore, for example, by using the airframe maintenance-inspection system 1 according to this embodiment for educating ground staff, such as mechanics, the ground staff can check the status of the maintenance-inspection target A during a flight of the aircraft 10 by viewing a VR image (i.e., a three-dimensionally viewable image of the maintenance-inspection target A), so that the ground staff can intuitively learn the status of the maintenance-inspection target A.

This facilitates the understanding of the maintenance-inspection target A by the ground staff, thereby shortening the education period and also allowing the ground staff to smoothly proceed with an operation without feeling a sense of discomfort or feeling confused when the ground staff is to actually begin the operation.

Target

Although the above embodiment relates to an example where the maintenance-inspection target A is the wheel A1 stored in the airframe, the maintenance-inspection target A is not limited to the wheel A1. The maintenance-inspection target A may alternatively be a component, such as the engine, subjected to line maintenance.

Furthermore, although maintenance to be performed on the aircraft 10 includes dock maintenance and shop maintenance (also referred to as "factory maintenance") in addition to the aforementioned line maintenance, such maintenance may also be performed on the maintenance-inspection target A.

Figure 4:
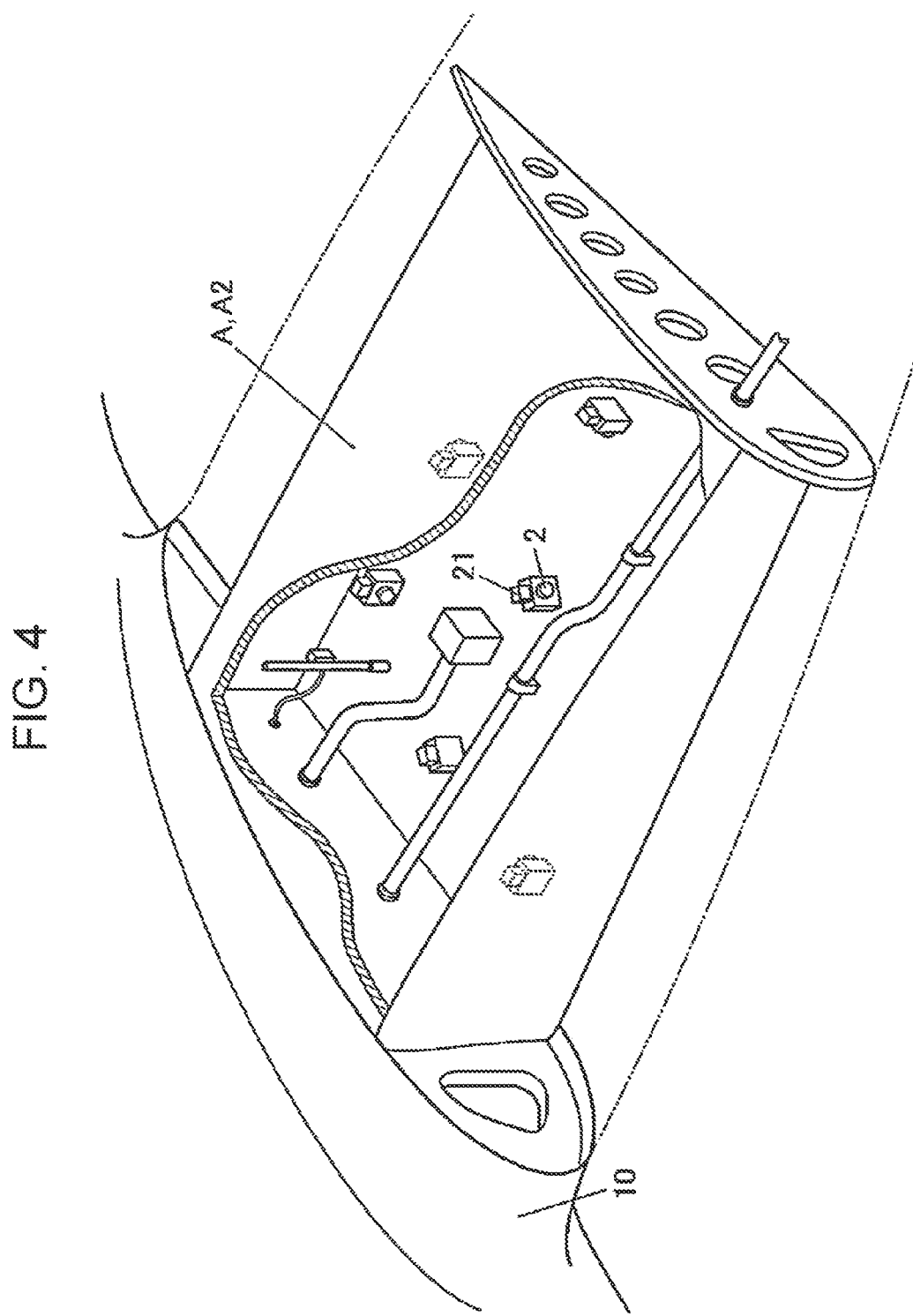
FIG. 4 illustrates the imaging devices and so on disposed inside a fuel tank.

For example, as illustrated in FIG. 4, in a case where the maintenance-inspection target A is a fuel tank A2, the interior of the fuel tank A2 can be photographed by disposing the plurality of imaging devices 2 and illuminators 21 inside the fuel tank A2. The imaging devices 2 may alternatively be disposed outside the fuel tank A2 to capture external images thereof.

With this configuration, the fuel tank A2 can be inspected without disassembling the fuel tank A2. By utilizing the airframe maintenance-inspection system 1 according to this embodiment in this manner, a maintenance and inspection process can be performed on the maintenance-inspection target A without breaking the hermetic structure or the seal structure of each component.

By utilizing such features of the airframe maintenance-inspection system 1 according to this embodiment, the following effects can be achieved.

With regard to components that are not to be inspected among the components of the aircraft 10, the number of components tends to increase when the components are given a break-proof protection design or when redundancy is ensured in case the components break. However, by applying the airframe maintenance-inspection system 1 according to this embodiment to such components, as mentioned above, the components can be constantly inspected for whether they are broken, and can be simply replaced if they are broken, whereby the protection design can be simplified and redundancy is not to be ensured.

Therefore, by applying the airframe maintenance-inspection system 1 according to this embodiment to such components, a wasteful increase in the number of components can be suppressed, so that more inexpensive components can be used, thereby suppressing a sharp increase in the price of the aircraft 10, as well as achieving a reduction in the weight of the aircraft 10.

Abnormal Vibration Detection and Moving-Object Detection

For example, when a problem occurs in the engine, the engine may vibrate abnormally.

Furthermore, when a fixed component within the airframe becomes detached or when a cable breaks, an object that originally does not move or dangle in the airframe may move or dangle.

A situation where an abnormal vibration of the maintenance-inspection target A is detected or movement of the maintenance-inspection target A that originally does not move is detected may sometimes imply that some kind of abnormality has occurred.

The images captured by the imaging devices 2 of the airframe maintenance-inspection system 1 according to this embodiment may be used to perform abnormal vibration detection and moving-object detection on the maintenance-inspection target A.

In this case, the imaging devices 2 may be still-image capturing devices or may be configured to perform abnormal vibration detection and moving-object detection. On the other hand, if the imaging devices 2 are moving-image capturing devices, the imaging devices 2 may be configured to perform abnormal vibration detection and moving-object detection on the maintenance-inspection target A by capturing a moving image of the maintenance-inspection target A.

The image used may be a VR image generated by the generator 43 of the display device 4, as described above, or may be images (i.e., raw images prior to being combined into a VR image) captured by the individual imaging devices 2.

Then, an image analyzer may analyze the captured image of the maintenance-inspection target A and perform abnormal vibration detection and moving-object detection (i.e., either one of or both of abnormal vibration detection and moving-object detection) on the maintenance-inspection target A.

The generator 43 of the display device 4 may be configured to function as the image analyzer, or the image analyzer may be provided separately from the generator 43. Furthermore, if the image analyzer detects an abnormal vibration or a moving object, for example, a message indicating the detection may be displayed on either one of a screen of the headset 41 and a display screen of the image analyzer, or an audio notification indicating the detection may be provided.

By using the image analyzer to perform abnormal vibration detection and moving-object detection on the maintenance-inspection target A in this manner, an abnormal vibration of the maintenance-inspection target A and movement of the maintenance-inspection target A that originally does not move can be detected, thereby accurately detecting that some kind of abnormality has occurred in the maintenance-inspection target A. Moreover, the abnormal vibration and the movement can be detected while the aircraft 10 is still flying.

Consequently, an abnormality occurring in the maintenance-inspection target A can be quickly and appropriately dealt with during line maintenance, dock maintenance, or shop maintenance, so that the operation rate of the aircraft 10 can be maintained and improved also with regard to this point.

For example, if an abnormal vibration is occurring in the maintenance-inspection target A, the imaging devices 2 may possibly vibrate together with the maintenance-inspection target A, thus making it difficult for the image analyzer to appropriately detect the abnormal vibration by an analysis.

In such a case, for example, a rod-like component, a linear (thread-like) component, or a planar component that oscillates due to a vibration of the maintenance-inspection target A may be disposed near the maintenance-inspection target A and may be photographed when the maintenance-inspection target A is to be photographed by the imaging devices 2. The image analyzer may be configured to analyze the oscillation of the component to detect whether the maintenance-inspection target A is vibrating abnormally.

With this configuration, if an abnormal vibration is occurring in the maintenance-inspection target A, the image analyzer can appropriately detect the abnormal vibration.

The embodiment of the disclosure is not limited to that described above, and may be modified, as appropriate, so long as the modification does not depart from the scope of the embodiment of the disclosure.

According to the embodiment of the disclosure, a maintenance and inspection process can be efficiently performed on the airframe of the aircraft, so that the operation rate of the aircraft can be maintained and improved.

The invention claimed is:

1. An airframe maintenance-inspection system comprising:
    a plurality of imaging devices disposed in an aircraft, the plurality of imaging devices configured to capture images of a maintenance-inspection target and a component in a state where a vibration of the maintenance-inspection target occurs an oscillation of the component having a rod shape, a linear shape or a planar shape different from the maintenance-inspection target during a flight of the aircraft;
    a transmitter configured to transmit the images captured by the imaging devices; and
    a display device configured to display a shape of the maintenance-inspection target in a three-dimensionally viewable state based on the images transmitted by the transmitter,
    wherein the display device is configured to perform a detection of an abnormal vibration of the maintenance-inspection target based on analyzing the oscillation of the component, and display an indication representing the detection of the abnormal vibration.

2. The airframe maintenance-inspection system according to claim 1,
    wherein the display device comprises
    a headset configured to be worn on a head of a user of the display device and display a virtual reality image,
    a sensor configured to detect movement and orientation of the headset, and
    a generator configured to generate the virtual reality image of the maintenance-inspection target based on the images in accordance with the movement and the orientation of the headset detected by the sensor.

3. The airframe maintenance-inspection system according to claim 2,
    wherein the images are wireles sly transmitted from the imaging devices to the transmitter and electric power is supplied to the imaging devices wirelessly.

4. The airframe maintenance-inspection system according to claim 3,
    wherein each of the imaging devices is configured to capture a moving image of the maintenance-inspection target, and
    wherein the generator is further configured to perform either one of or both of abnormal vibration detection and moving-object detection on the maintenance-inspection target by analyzing the captured moving image of the maintenance-inspection target.

5. The airframe maintenance-inspection system according to claim 2,
    wherein each of the imaging devices is configured to capture a moving image of the maintenance-inspection target, and
    wherein the generator is further configured to perform either one of or both of abnormal vibration detection and moving-object detection on the maintenance-inspection target by analyzing the captured moving image of the maintenance-inspection target.

6. The airframe maintenance-inspection system according to claim 1,
    wherein the images are wireles sly transmitted from the imaging devices to the transmitter and electric power is supplied to the imaging devices wirelessly.

7. The airframe maintenance-inspection system according to claim 6,
    wherein each of the imaging devices is configured to capture a moving image of the maintenance-inspection target, and
    wherein the generator is further configured to perform either one of or both of abnormal vibration detection and moving-object detection on the maintenance-inspection target by analyzing the captured moving image of the maintenance-inspection target.

8. The airframe maintenance-inspection system according to claim 1, wherein:
    the plurality of imaging devices includes an imaging device disposed inside a fuel tank of the aircraft, and
    the display device is configured to display an inside shape of the fuel tank in a three-dimensionally viewable state.

9. The airframe maintenance-inspection system according to claim 1,
    wherein the maintenance-inspection target includes a wheel of the aircraft or an engine of the aircraft.

10. The airframe maintenance-inspection system according to claim 1, wherein:
    the aircraft includes an airframe, wheels stored within the airframe during the flight of the aircraft, and a shaft between the wheels,
    the plurality of imaging devices includes, in a plan view of a structure including the wheels, the shaft and the plurality of imaging devices within the airframe, a first imaging device overlapping the shaft, a first illuminator adjacent to the first imaging device, a second imaging device separate from the wheels and the shaft, and a second illuminator adjacent to the second imaging device, and the display device is configured to display a shape of the wheels in a three-dimensionally viewable state based on the images transmitted by the transmitter.

11. The airframe maintenance-inspection system according to claim 1, wherein the plurality of imaging devices is configured to capture an image of the maintenance-inspection target at a timing at which the aircraft has reached a predetermined distance from an airport where the aircraft plans to land, or a timing prior to a scheduled arrival time to the airport by a predetermined time period, and transmit the captured image to the transmitter.

* * * * *